United States Patent
Imade et al.

(10) Patent No.: US 12,438,468 B2
(45) Date of Patent: Oct. 7, 2025

(54) INSULATED POWER SUPPLY APPARATUS AND SEMICONDUCTOR DEVICE FOR POWER SUPPLY CONTROL

(71) Applicants: Daisuke Imade, Isehara (JP); Hiroki Matsuda, Zama (JP); Takumi Hyugaji, Isehara (JP); Yukio Murata, Tokyo (JP)

(72) Inventors: Daisuke Imade, Isehara (JP); Hiroki Matsuda, Zama (JP); Takumi Hyugaji, Isehara (JP); Yukio Murata, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 236 days.

(21) Appl. No.: 18/348,405

(22) Filed: Jul. 7, 2023

(65) Prior Publication Data
US 2024/0014741 A1    Jan. 11, 2024

(30) Foreign Application Priority Data

Jul. 7, 2022  (JP) .................................. 2022-109659
Jun. 5, 2023  (JP) .................................. 2023-092251

(51) Int. Cl.
H02M 3/335    (2006.01)
(52) U.S. Cl.
CPC ..... *H02M 3/33507* (2013.01); *H02M 3/3353* (2013.01)
(58) Field of Classification Search
CPC ........... H02M 1/0032; H02M 3/33507; H02M 3/33569; H02M 3/33523
See application file for complete search history.

(56) References Cited

U.S. PATENT DOCUMENTS

| 9,502,965 | B1* | 11/2016 | Hsiao | H02M 3/156 |
| 9,991,800 | B2 | 6/2018 | Hari | |
| 2010/0219802 | A1* | 9/2010 | Lin | H02M 3/33507 |
| | | | | 323/284 |
| 2019/0074765 | A1* | 3/2019 | Hari | H02M 1/126 |
| 2019/0199222 | A1* | 6/2019 | Lin | H02M 3/33507 |

* cited by examiner

*Primary Examiner* — Alex Torres-Rivera
(74) *Attorney, Agent, or Firm* — Shih IP Law Group, PLLC

(57) ABSTRACT

An insulated power supply apparatus includes: a transformer; a switching element connected in series with a primary-side winding of the transformer; an active clamp circuit connected between terminals of the winding; and a semiconductor device for power supply control that controls the switching element and the active clamp circuit. A current-to-voltage converter element is connected in series with the switching element. The semiconductor device includes: a circuit that generates a timing to turn off the switching element based on a voltage obtained by conversion by the converter element and a predetermined turn-off threshold level; a circuit that performs ON/OFF control of the switching element in a burst mode at a predetermined load or less; and a circuit that, in the burst mode, changes a burst frequency to be lower as a load current is smaller with the number of switching times of the switching element in one burst cycle fixed.

8 Claims, 15 Drawing Sheets

INSULATED POWER SUPPLY APPARATUS AND SEMICONDUCTOR DEVICE FOR POWER SUPPLY CONTROL

REFERENCE TO RELATED APPLICATIONS

This application is based upon and claims the benefit of priority from the prior Japanese Patent Applications No. 2022-109659, filed on Jul. 7, 2022, and No. 2023-092251, filed on Jun. 5, 2023, the entire contents of which are incorporated herein by reference.

TECHNICAL FIELD

The present disclosure relates to a semiconductor device for power supply control that controls a switching element connected in series with a primary-side winding of a transformer for voltage conversion, in particular, a useful technique that is used in an isolated power supply apparatus including an active clamp circuit and in a semiconductor device for power supply control constituting the apparatus.

DESCRIPTION OF RELATED ART

As one of conventional switching power supply apparatuses, there is a switching power supply apparatus (isolated DC-DC converter) including: a transistor (on a silicon substrate or on a GaN or SiC substrate) as a switching element for intermittently flowing an electric current to a primary-side winding of a transformer; and a control circuit (IC) that performs ON/OFF control of the switching element, wherein an electric current induced in a secondary-side winding by the electric current flowed to the primary-side winding is rectified by a diode, smoothed by a capacitor and output.

Examples of DC power supply apparatuses include a diode bridge circuit that rectifies an AC power source and an isolated AC-DC converter with the abovementioned switching power supply apparatus (isolated DC-DC converter) that steps down and converts a DC voltage obtained by the rectification by the circuit into a DC voltage of a desired potential.

For such an isolated AC-DC converter, there is a switching method, called soft switching, of making use of a high-frequency resonance phenomenon and turning on/off a switching element when an applied voltage to the switching element is 0 V or a conduction current thereof is 0 A. The method of performing the switching at the timing of a voltage of zero is called zero voltage switching.

A conventional isolated AC-DC converter or isolated DC-DC converter (referred to as an isolated power supply apparatus) having a transformer may be provided with an active clamp circuit having an energy regeneration function and provided between terminals of a primary-side winding of the transformer, in order to improve efficiency.

A technique related to a switching power supply apparatus (isolated power supply apparatus) provided with an active clamp circuit is disclosed, for example, in U.S. Pat. No. 9,991,800.

Also, there is an isolated power supply apparatus that performs ON/OFF drive of a switching element (main switch element) on the primary side in a continuous mode in a heavy load region, and has a burst mode provided with a period during which the ON/OFF drive of the switching is stopped for medium load to light load regions. In U.S. Pat. No. 9,991,800, there is disclosed a technique related to an isolated power supply apparatus that, when a load current is below a predetermined level, controls a main switch element and a switch element for clamp to cause a flyback converter to operate in a discontinuous conduction mode with a changeable switching frequency.

SUMMARY OF THE INVENTION

These days, there is a demand to miniaturize isolated power supply apparatuses, in particular, AC adapters. For the miniaturization, a high output and a high power density are necessary, and for these, it is effective to reduce the size of a transformer by making a switching frequency of a main switch element on the primary side high. However, an AC adapter (isolated power supply apparatus) using a primary-side control IC that performs ON/OFF drive of a main switch element by PWM control/quasi-resonant control has a problem that if the switching frequency is made high, the power loss increases and the efficiency decreases. Further, it has been found that an active clamp circuit has a problem that in medium load to light load regions, the switching frequency increases and the efficiency significantly decreases.

The present disclosure has been conceived in view of the above problems, and objects thereof include providing an isolated power supply apparatus that suppresses a decrease in efficiency in medium load to light load regions too, thereby having a high average efficiency, and a semiconductor device for power supply control constituting the apparatus.

In order to achieve the object(s), according to an aspect of the present disclosure, there is provided an insulated power supply apparatus including:
  a transformer for voltage conversion;
  a switching element connected in series with a primary-side winding of the transformer;
  an active clamp circuit connected between terminals of the primary-side winding of the transformer; and
  a semiconductor device for power supply control that controls the switching element and the active clamp circuit,
  wherein a current-to-voltage converter element is connected in series with the switching element, and
  wherein the semiconductor device for power supply control includes:
    a circuit that generates a timing to turn off the switching element based on a voltage obtained by conversion by the current-to-voltage converter element and a predetermined turn-off threshold level;
    a circuit that performs ON/OFF control of the switching element in a burst mode at a predetermined load or less; and
    a circuit that, in the burst mode, changes a burst frequency to be lower as a load current is smaller with the number of switching times of the switching element in one burst cycle fixed.

BRIEF DESCRIPTION OF DRAWINGS

The accompanying drawings are not intended as a definition of the limits of the present disclosure but illustrate embodiments of the disclosure, and together with the general description given above and the detailed description of the embodiments given below, serve to explain the principles of the disclosure, wherein.

DETAILED DESCRIPTION

Hereinafter, preferable embodiments of the present disclosure will be described with reference to the drawings.

Figure 1:
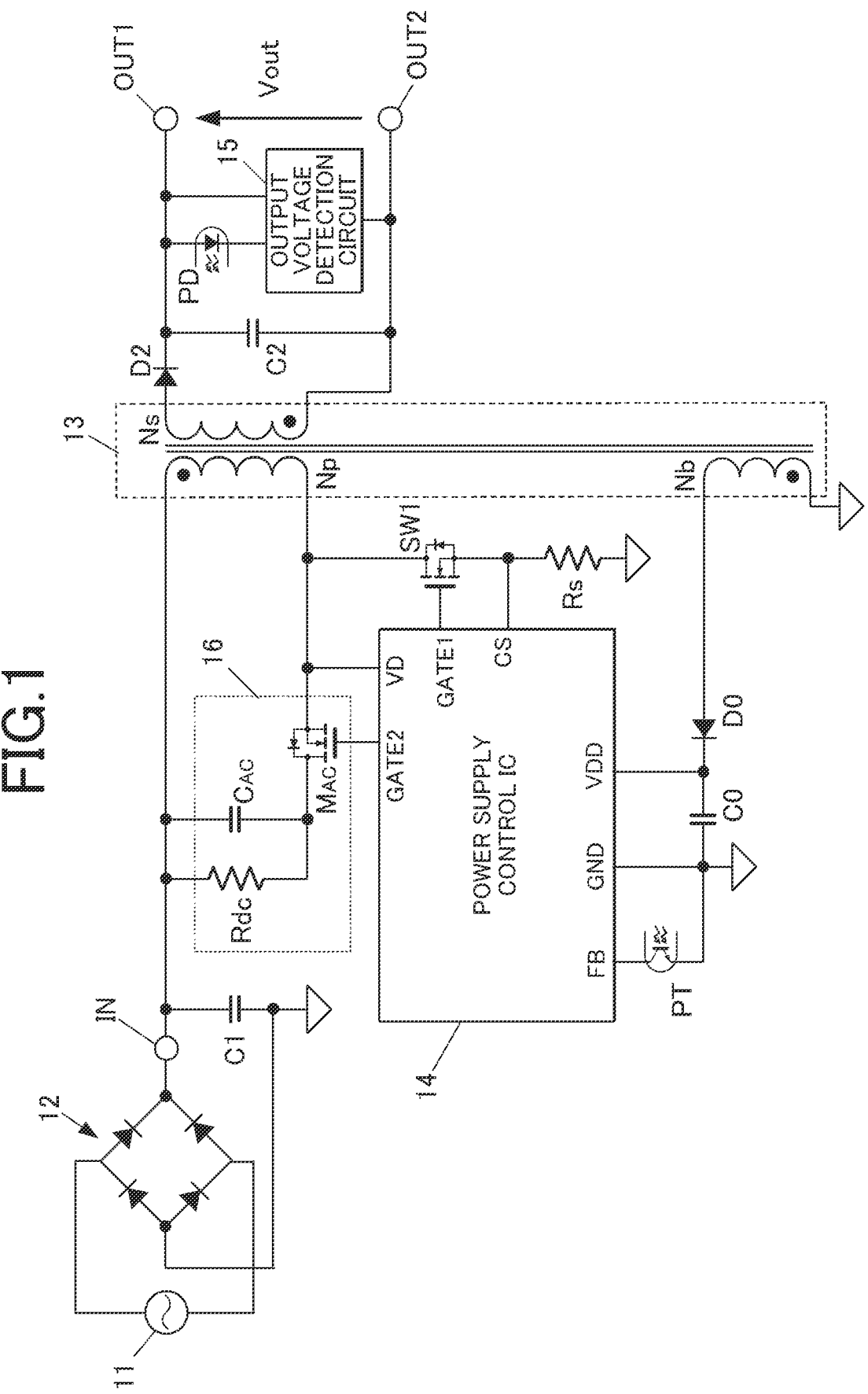
FIG. 1 is a circuit configuration diagram showing an embodiment of an AC-DC converter as an isolated power supply apparatus of the present disclosure.

FIG. 1 is a circuit configuration diagram showing an embodiment of an AC-DC converter as an isolated power supply apparatus of the present disclosure.

The AC-DC converter of this embodiment is a flyback converter, and includes a diode bridge circuit 12 that rectifies an AC voltage from an AC power source 11, a smoothing capacitor C1, a transformer 13 for voltage conversion having a primary-side winding Np, a secondary-side winding Ns and an auxiliary winding Nb and connected to a voltage input terminal IN, a switching transistor (which is hereinafter referred to as a main switch) SW1 connected in series with the primary-side winding Np of the transformer 13, and a semiconductor device for power supply control (which is hereinafter referred to as a power supply control IC) 14 that drives the main switch SW1 to be ON/OFF.

On the secondary side of the transformer 13, there are provided a rectifying diode D2 connected in series with the secondary-side winding Ns and a smoothing capacitor C2 connected between the cathode terminal of the diode D2 and the other terminal of the secondary-side winding Ns to rectify and smooth an AC voltage induced in the secondary-side winding Ns by an electric current being intermittently flowed to the primary-side winding Np, thereby generating a DC output voltage Vout and outputting same from output terminals OUT1, OUT2.

On the secondary side of the transformer 13, there are also provided an output voltage detection circuit 15 that is composed of a shunt regulator provided with an error amplifier and/or the like and detects the output voltage Vout and a light emitting diode PD that constitutes a photocoupler to transmit an output voltage detection signal corresponding to the detected voltage to the primary side of the transformer 13.

Meanwhile, on the primary side of the transformer 13, there is provided a phototransistor PT that constitutes the photocoupler together with the light emitting diode PD, and the power supply control IC 14 is provided with an external terminal FB to which the phototransistor PT is connected. That is, to the light emitting diode PD, an electric current corresponding to the voltage detected by the output voltage detection circuit 15 flows, and is transmitted (fed back) to the primary side as an optical signal having an intensity corresponding to the detected voltage, so that an electric current corresponding to the optical intensity flows through the phototransistor PT, and this electric current is converted into a voltage VFB by a pull-up resistor or the like in the power supply control IC 14 and supplied to an internal circuit.

In the AC-DC converter of this embodiment, the higher the output voltage Vout on the secondary side, the more the electric current flowing through the light emitting diode PD and the electric current flowing through the phototransistor PT, and the lower the voltage VFB at the external terminal FB of the power supply control IC 14.

The power supply control IC 14 is also provided with an external terminal CS as a current detection terminal. To this external terminal CS, a voltage Vcs is input, the voltage Vcs into which the drain current of the main switch SW1 is current-to-voltage-converted by a resistor Rs for current detection connected between the source terminal of the main switch SW1 and the ground point. In this embodiment, the external terminal FB is configured for voltage feedback, but may be configured for current feedback.

In this embodiment, there is provided an active clamp circuit 16 that includes a transistor MAC and a capacitor CAC and is connected in the form of series between the low-side terminal of the primary-side winding Np of the transformer 13 and the voltage input terminal IN. The power supply control IC 14 has therein an active clamp control circuit that controls the transistor MAC of the active clamp circuit 16. Although not particularly limited, a discharging resistor Rdc for discharging electric charges of the capacitor CAC is connected to the capacitor CAC in parallel.

The AC-DC converter of this embodiment is provided with a rectifying-smoothing circuit including a rectifying diode D0 connected in series with the auxiliary winding Nb of the transformer 13 and a smoothing capacitor C0 connected between the cathode terminal of this diode D0 and the ground point. A voltage rectified and smoothed by the rectifying-smoothing circuit is applied to a power supply voltage terminal VDD of the power supply control IC 14 to be a power supply voltage of the internal circuit of the IC.

In this embodiment, the main switch SW1 and the transistor MAC for active clamp are configured by N-channel MOSFETs (insulated gate field-effect transistors) as discrete components. The MOSFETs are preferably GaN-based ones, but not limited thereto.

The power supply control IC 14 is also provided with an external terminal GATE1 that outputs a signal to drive the gate terminal of the main switch SW1, an external terminal GATE2 that outputs a signal to drive the gate terminal of the transistor MAC, and an external terminal VD to which the drain voltage of the main switch SW1 is input. To the external terminal VD, a voltage obtained by an external series resistor dividing the drain voltage of the main switch SW1 may be input.

The power supply control IC 14 of this embodiment has a function of monitoring the voltage VD at the external terminal VD to which the drain voltage of the main switch SW1 is input and generating a turn-on signal for the main switch SW1 and also has a function (comparator) of comparing the voltage Vcs at the current detection terminal CS with a predetermined reference voltage (e.g., the voltage VFB at the feedback terminal FB) and generating a turn-off signal for the main switch SW1.

The power supply control IC 14 also has a function of detecting the bottom of resonance of the drain voltage VD of the main switch SW1 and a ZVS (zero voltage switching) control function of turning on the main switch SW1 when detecting that the VD is equal to or less than a predetermined threshold.

Although not shown, the active clamp control circuit of the power supply control IC 14 is provided with a ZVS determining circuit that, when determining on the basis of an input voltage to the external terminal CS or the like that the voltage on the drain side of the main switch SW1 is zero voltage, determines whether the zero voltage switching control is being performed. The power supply control IC 14 also includes a signal generation circuit that generates a control signal to control the active clamp circuit. The signal generation circuit has a function of extending an ON time of the transistor MAC, which constitutes the active clamp circuit 16, by a predetermined amount if the ZVS determining circuit determines that the zero voltage switching control is not being performed. The above configuration is not a limitation but an example. Configurations like the above configuration are disclosed in Japanese Patent Application No. 2021-207662 and Japanese Patent Application No. 2021-207666.

The power supply control IC 14 has a continuous operation mode in which the ON/OFF control of the main switch SW1 is performed by PWM control/quasi-resonant control in a heavy load region and a burst mode in which the ON/OFF control of the main switch SW1 is performed in medium load to light load regions and a switching stop period is provided (in the case of active clamp flyback, has a continuous operation mode in which the ON/OFF control of the main switch SW1 and the transistor MAC for active clamp is performed by active clamp flyback control in a heavy load region and a burst mode in which the ON/OFF control of the main switch SW1 and the transistor MAC for active clamp is performed in medium load to light load regions and a switching stop period is provided). In this embodiment, for the sake of convenience, a transition mode and a critical mode in the quasi-resonant type and the active clamp flyback are included in the continuous operation mode.

The operation in the burst mode (switching control) is the most characteristic operation that the power supply control IC 14 of this embodiment does and an unique operation that conventional ICs do not do. Hereinafter, this operation in the burst mode will be detailed.

The power supply control IC 14 of this embodiment shifts from the continuous operation mode, in which the PWM control is performed, to the burst mode when a load current Io is equal to or less than a predetermined value set in advance.

At a switching point from the continuous operation mode to the burst mode, a burst frequency is a predetermined frequency (e.g., ft/4) lower than a switching frequency. In the burst mode, as shown in FIG. 2, a burst frequency fb is reduced as the load current Io is smaller, and the number of times that the main switch SW1 (and the transistor MAC for active clamp) is turned on during one burst cycle is fixed at a predetermined number of times, for example, four times (and three times for the transistor MAC).

Figure 2:
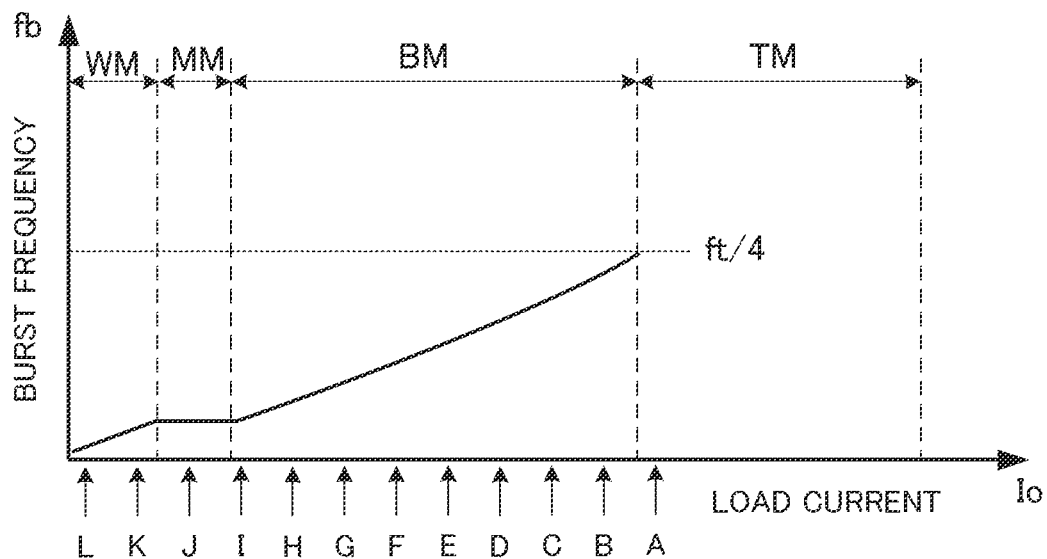
FIG. 2 is a characteristic diagram showing an example of a load current to burst frequency characteristic in a burst mode of the AC-DC converter of FIG. 1.

In the power supply control IC 14 of this embodiment, as shown in FIG. 2, in a low-power-mode's region MM where the load current Io is smaller than that in a region where a burst mode BM is executed, the burst frequency fb is fixed at a frequency at a switching point from the burst mode BM, and in a waiting-mode's region WM where the load current Io is further smaller, the burst frequency is reduced as the load current Io is smaller.

Figure 3:
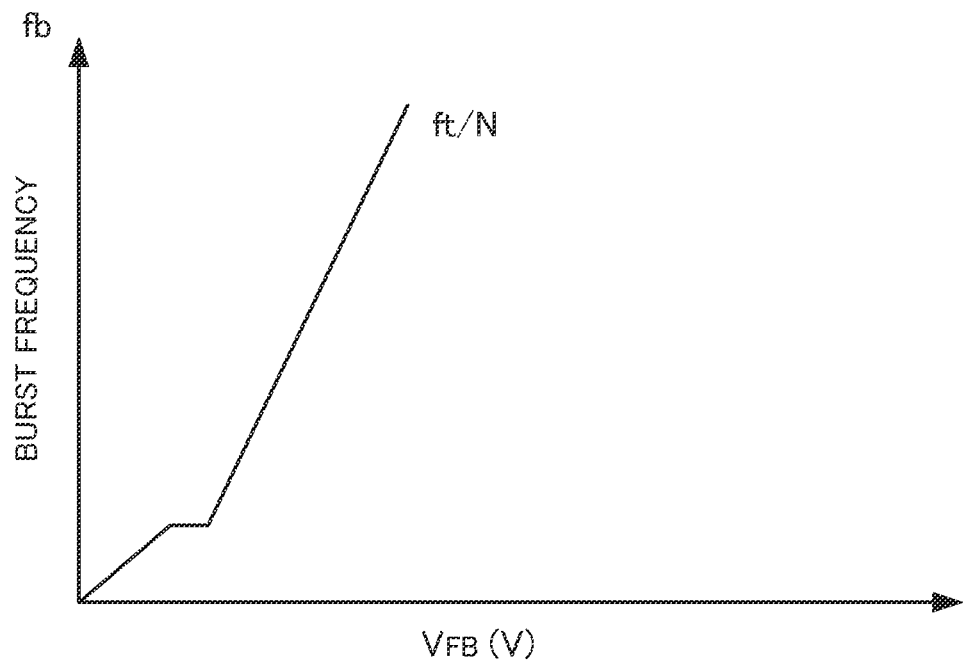
FIG. 3 is a characteristic diagram showing an example of a feedback voltage to burst frequency characteristic of the AC-DC converter of FIG. 1.

In the case of a circuit configuration to compare the voltage Vcs at the current detection terminal CS with the voltage VFB at the feedback terminal FB and generate the turn-off signal for the main switch SW1, in order to enable the above-described burst operation, change of the burst frequency fb with respect to the feedback voltage VFB is set to a characteristic shown in FIG. 3. Also, change of a turn-off threshold level VCST for the main switch SW1 with respect to the feedback voltage VFB is set to a characteristic shown in FIG. 4.

Figure 4:
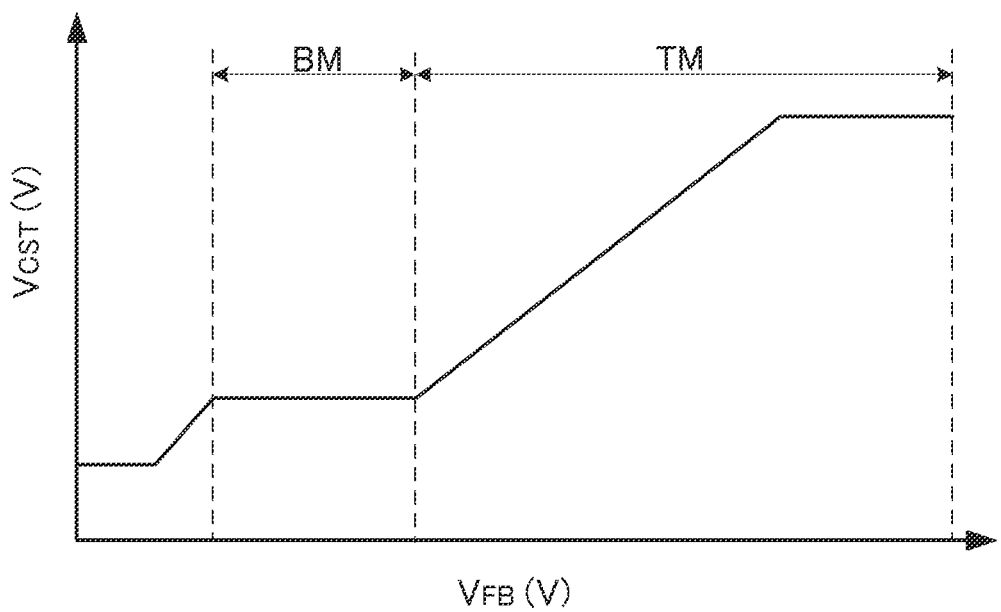
FIG. 4 is a characteristic diagram showing an example of a feedback voltage to turn-off threshold level characteristic of the AC-DC converter of FIG. 1.
Figure 5:
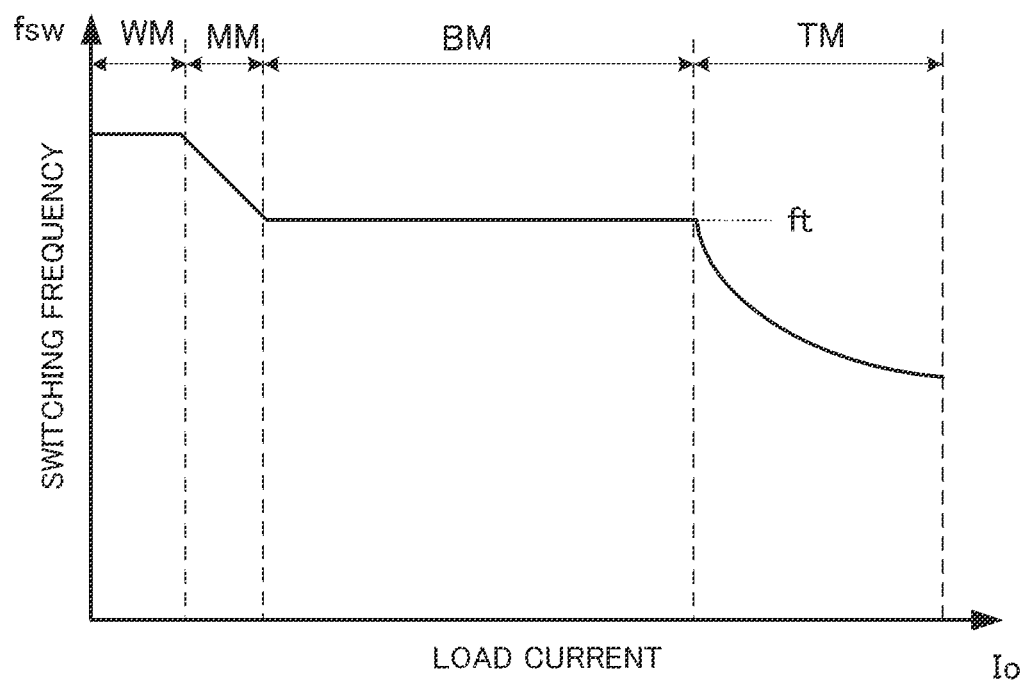
FIG. 5 is a characteristic diagram showing an example of a load current to switching frequency characteristic of the AC-DC converter of FIG. 1.

The change of the turn-off threshold level VCST for the main switch SW1 being set to the characteristic shown in FIG. 4 results in change of a switching frequency fsw of the main switch SW1 shown in FIG. 5. FIG. 4 shows a set example of the turn-off threshold level VCST in a continuous operation mode TM in addition to in the burst mode BM, and FIG. 5 shows an example of the change of the switching frequency fsw in the continuous operation mode TM due to the VCST thus set, too. However, the characteristic of the switching frequency fsw in the continuous operation mode TM is not limited to that shown in FIG. 5.

In the power supply control IC 14 of this embodiment, for example, when the main switch SW1 is turned on four times per burst cycle in the burst mode, four on-pulses (and three on-pulses for the transistor MAC for active clamp) are generated in succession, namely, the main switch SW1 is turned on four times in succession.

By turning on the main switch SW1 four times in succession, the ZVS (zero volt switching) can be performed when the main switch SW1 is turned on/off the second time to the fourth time among the four times, so that the loss in the main switch SW1 can be reduced.

Figure 6:
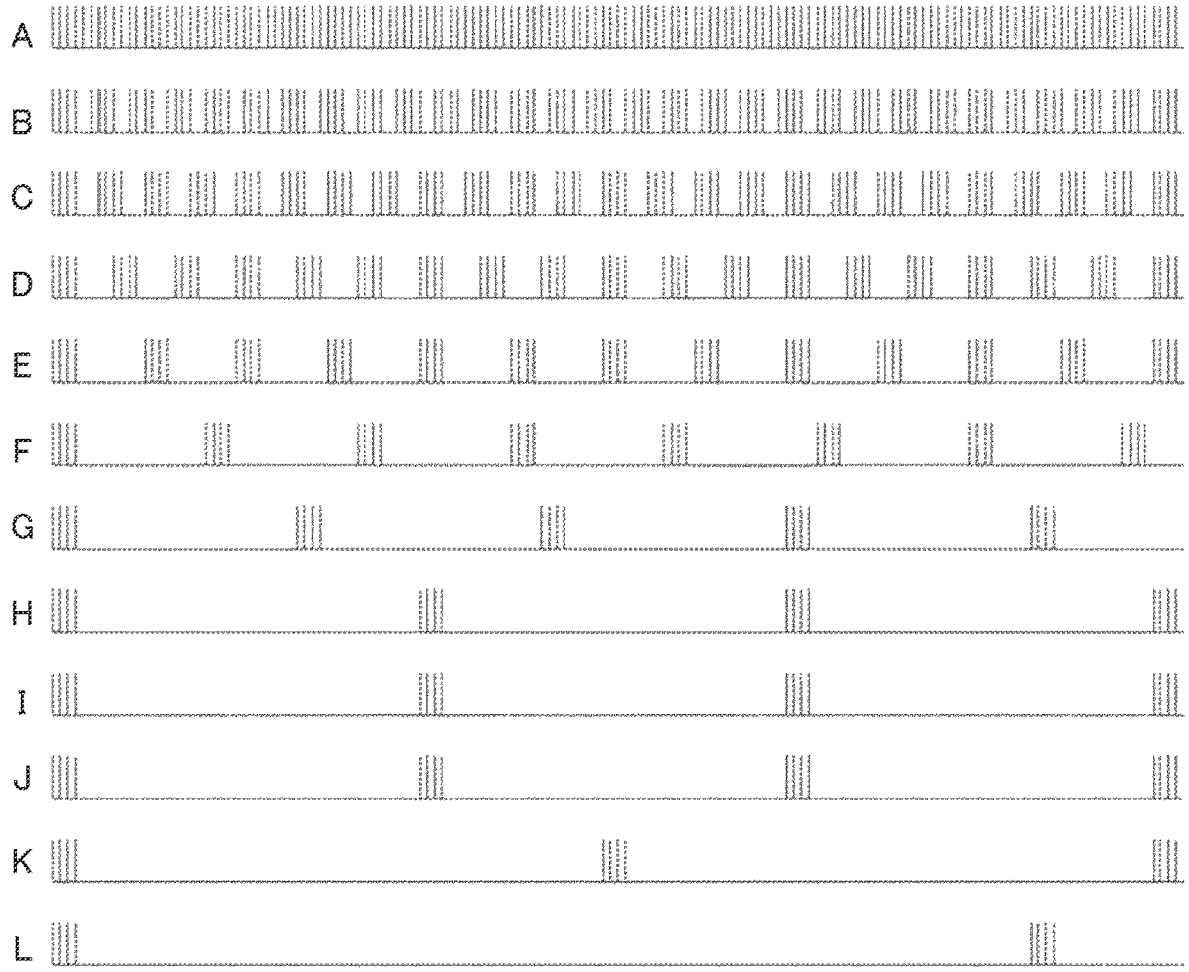
FIG. 6 is a timing chart showing an example of timings of on-pulses of a main switch element in the burst mode of the AC-DC converter of FIG. 1.

FIG. 6 shows timings of on-pulses in the abovementioned case where four on-pulses are generated in succession. In FIG. 6, A indicates timings of generation of pulses of the PWM control immediately before shifting form the continuous operation mode to the burst mode, and B to L respectively indicate timings of generation of on-pulses at load current values indicated by arrows B to L in FIG. 2. The load current values are smaller in order from B to L, and the burst frequency is lower accordingly.

Figure 7A:
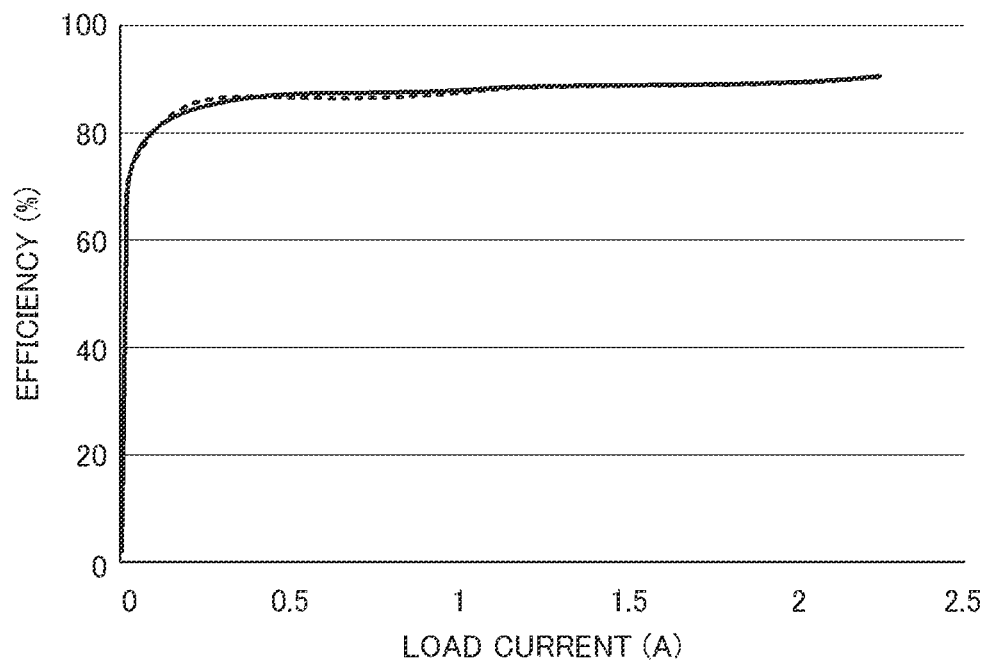
FIG. 7A is a characteristic diagram showing a load current to efficiency characteristic of the AC-DC converter of FIG. 1.

The inventors made prototypes of the power supply control IC 14 having the above-described functions using field programmable gate arrays (FPGAs) and measured the current value and the voltage value of each part to calculate the efficiency of the power supply apparatus shown in FIG. 1. The results are shown in FIG. 7A. As can be seen from FIG. 7A, from the heavy load region to the light load region, a high efficiency of nearly 90% is achieved and the loss is small.

As can be seen from FIG. 2, in the power supply control IC of the embodiment, in the region where the load current Io is small, the burst frequency fb enters the hearing range (20 kHz or less). Hence, in the light load region (e.g., near 0.2 A) where the burst frequency fb approaches the hearing range, the burst frequency fb may be made high. More specifically, for example, the burst frequency fb is set to twice the frequency (cycle is ½) in the above embodiment, and the number of ON times of the main switch SW1 in one cycle is set to two times, which is ½ of the number of ON times in the above embodiment, namely, four times. Even when this is performed, the total number of ON times in one period that is sufficiently longer than a burst cycle remains the same.

Figure 8A:
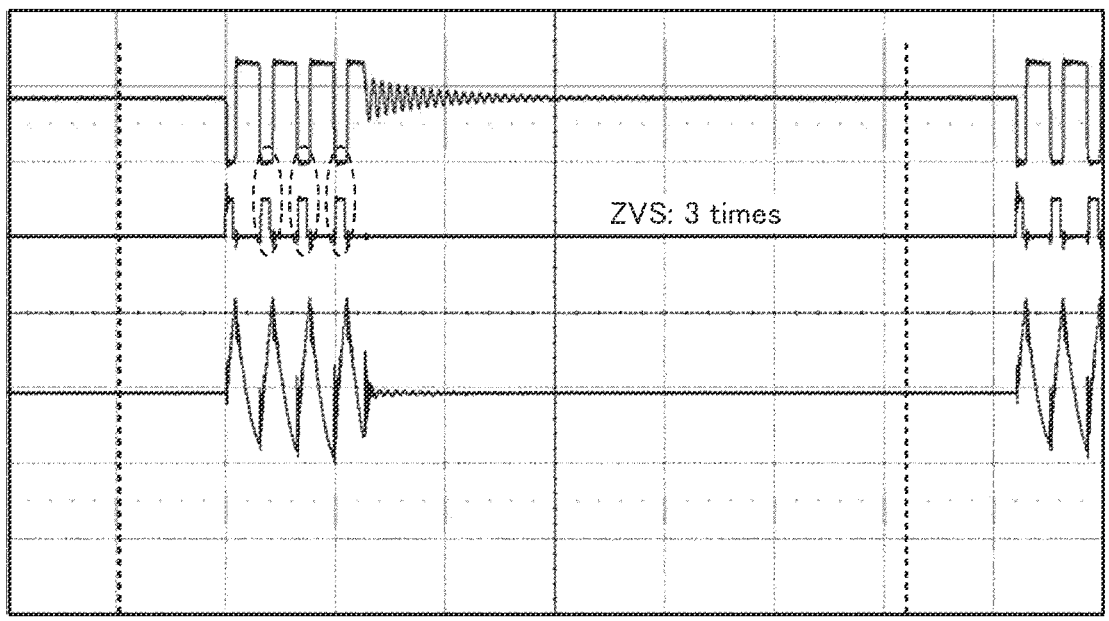
FIG. 8A is a timing chart showing an example of timings of on-pulses of the main switch element in one burst cycle of the AC-DC converter of FIG. 1.
Figure 8B:
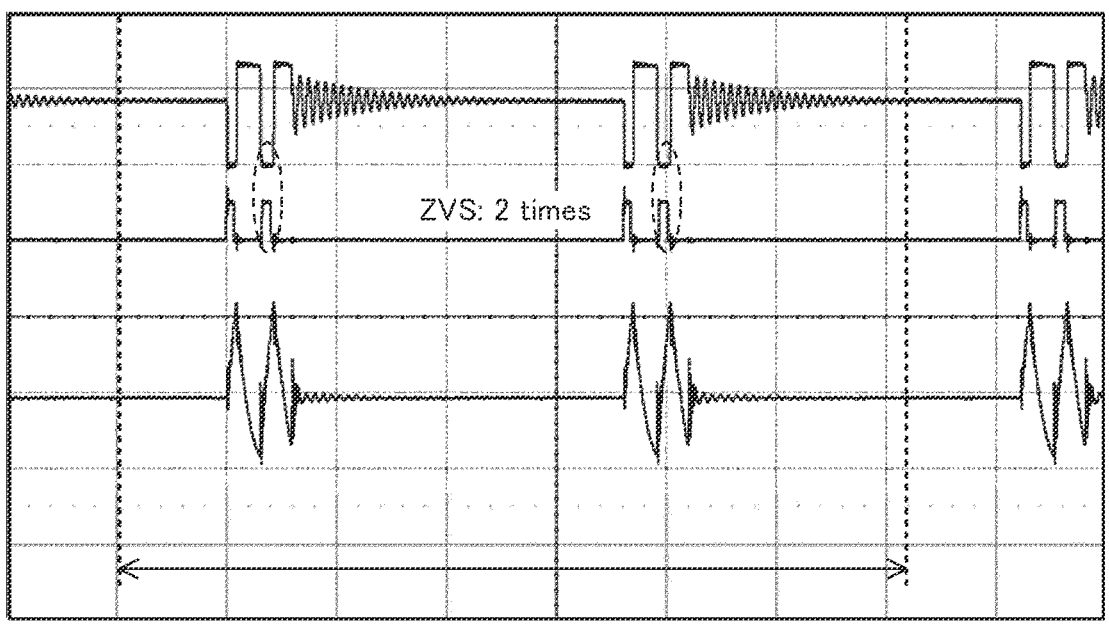
FIG. 8B is a timing chart showing an example of timings of on-pulses of the main switch element in one burst cycle of the AC-DC converter of FIG. 1.

FIG. 8A and FIG. 8B show changes in a drain-source voltage Vds of the main switch SW1, in a gate driving pulse of the SW1 and in an electric current of the primary-side winding before and after the burst frequency fb is doubled. FIG. 8A shows waveforms before the fb is doubled, and FIG. 8B shows waveforms after the fb is doubled. As can be seen from FIG. 8A and FIG. 8B, the number of pulses in one period in FIG. 8A and the number thereof in the same period in FIG. 8B are the same.

Figure 7B:
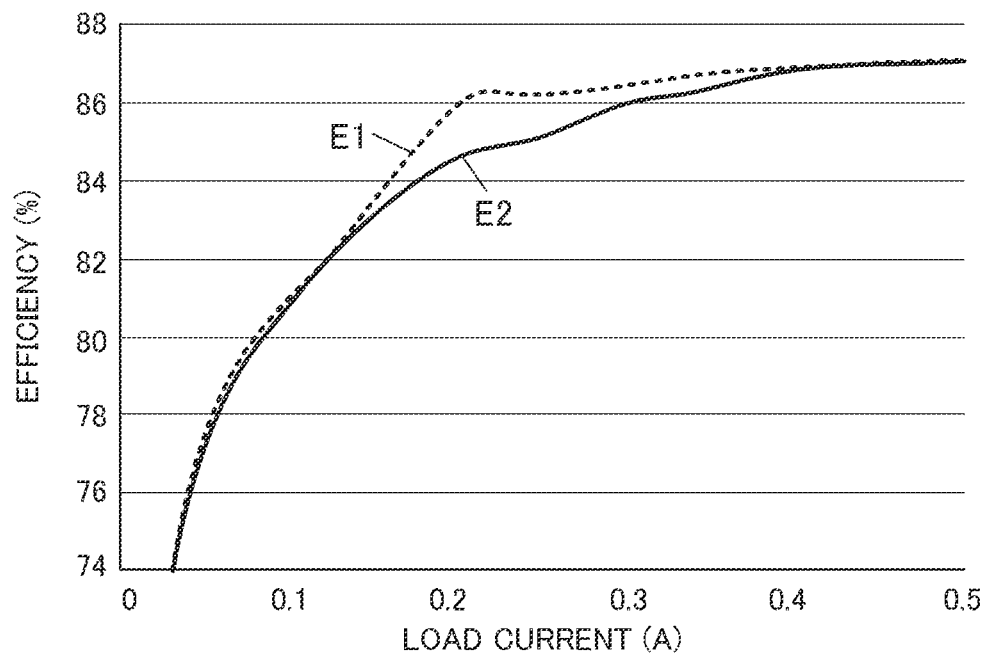
FIG. 7B is a characteristic diagram showing part of FIG. 7A in an enlarged manner.

FIG. 7B shows the efficiency in the region where the load current is 0-0.5 A in FIG. 7A in an enlarged manner. In FIG. 7B, E1 indicates the efficiency before the fb is doubled, and E2 indicates the efficiency after the fb is doubled. As can be seen from FIG. 7B, the efficiency E1 before the fb is doubled is higher in the range of 0.15-0.4 A.

In FIG. 8A and FIG. 8B, portions surrounded by ovals are where the ZVS (zero volt switching) is performed. The number of ZVS times is higher in FIG. 8A than in FIG. 8B. This is the reason why, in the range of the load current of 0.15-0.4 A, the efficiency E1 before the fb is doubled is higher than the efficiency E2 after the fb is doubled.

As described above, according to the isolated power supply apparatus using the power supply control IC 14 of the embodiment, in the burst mode, the number of switching times of the switching element (main switch element) in one burst cycle is fixed, and the burst frequency is changed to be lower as the load current is smaller. This can improve the efficiency at the time of the medium load to the light load, at which the switching control in the burst mode is performed. Further, during one burst cycle, the main switch element is turned on a predetermined number of times in succession, and the ZVS (zero volt switching) is performed when the main switch element is turned on/off. This can further improve the efficiency.

Figure 9A:
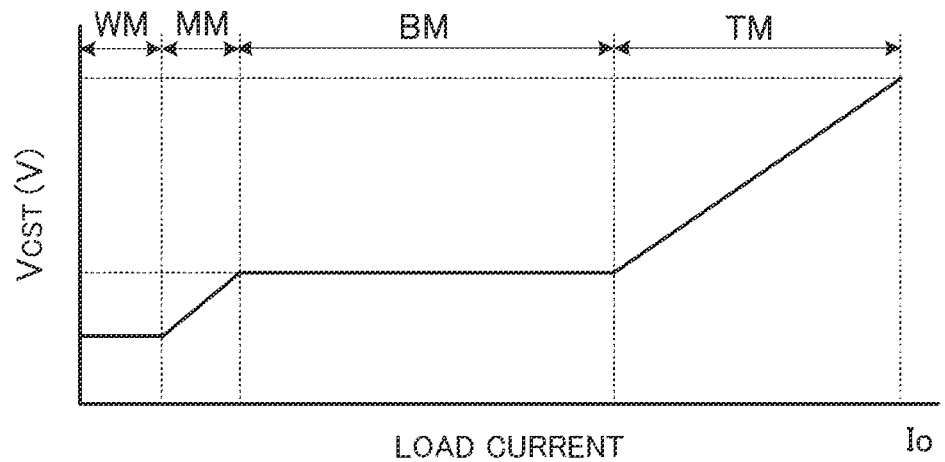
FIG. 9A is to show difference in a load current to turnoff threshold level characteristic between the AC-DC converter of an embodiment of FIG. 1 and an AC-DC converter of each modification.
Figure 9B:
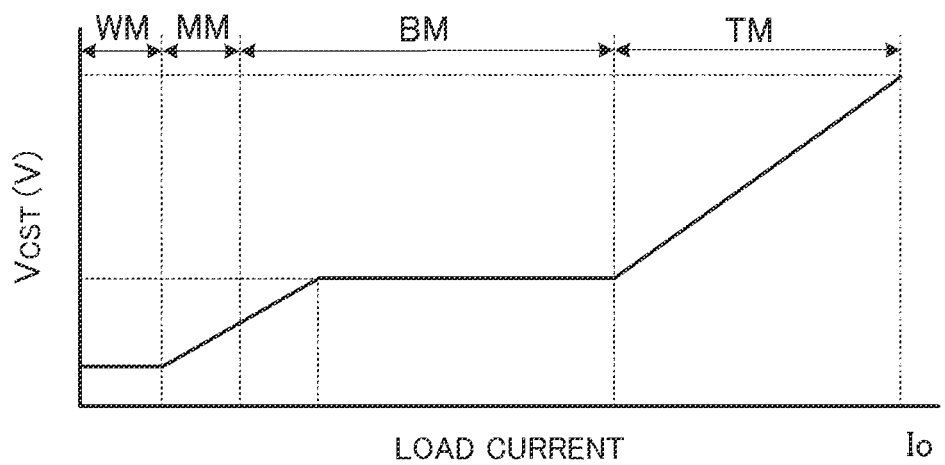
FIG. 9B is to show difference in the load current to turnoff threshold level characteristic between the AC-DC converter of the embodiment of FIG. 1 and the AC-DC converter of a modification.

Next, modifications of the above embodiment will be described with reference to FIG. 9A to FIG. 9C.

As described above, in the case where the number of ON times of the main switch SW1 is fixed in the burst mode, the burst frequency fb enters the hearing range in the light load region. In order to avoid this, in a modification, as shown in FIG. 9B, on the light load side in the burst mode, a shift is made to a peak-current-at-light-load modulation mode in which the turn-off threshold VCST for the main switch SW1 is reduced, so that the burst frequency fb does not enter the hearing range. For comparison, FIG. 9A shows a set example (corresponding to FIG. 4) of the turn-off threshold VCST for the main switch SW1, in the power supply control IC 14 of the above embodiment.

Figure 9C:
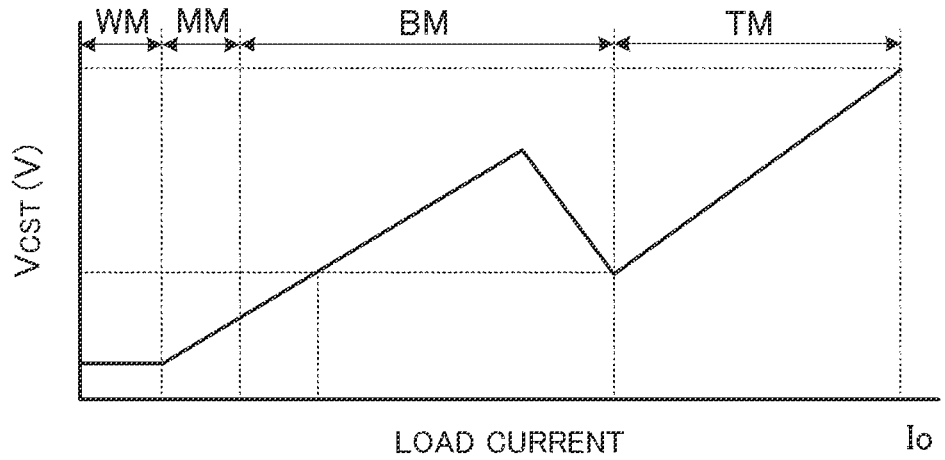
FIG. 9C is to show difference in the load current-turnoff threshold level characteristic between the AC-DC converter of the embodiment of FIG. 1 and the AC-DC converter of a modification.

Alternatively, as shown in FIG. 9C, in the burst mode operation region, a shift may be made to a peak-current modulation mode in which the turn-off threshold VCST for the main switch SW1 is changed appropriately. For example, in FIG. 9C, in the load region near which switching is made from the mode TM to the mode BM, the characteristic of the load current (or the voltage at the FB terminal) versus the CS terminal voltage has a reverse slope. This forcibly reduces the burst frequency in this region, thereby being able to reduce the number of hard-switching times per unit time and suppress a decrease in the efficiency.

In the above embodiment, in the burst mode, the number of times that the main switch SW1 is turned on during one burst cycle is fixed at four times, but this number of ON times in one burst cycle is not limited to four times, and may be five times, six times, etc. However, it is preferable that if the number of ON times is N, the frequency at the time of shifting to the burst mode be set to ft/N, which corresponds to 1/N of the switching frequency ft at the switching point from the continuous operation mode to the burst mode.

Second Embodiment

Next, a second embodiment of the present disclosure will be described.

In the above embodiment (first embodiment), as shown in FIG. 2, in the burst mode BM, the burst frequency is changed almost linearly with respect to the load current Io. In contrast, in the second embodiment, as indicated by a broken line in FIG. of the burst mode BM, in a wide range BMa, which is not a range close to the continuous operation mode TM, control is performed such that a change rate of a burst frequency fburst (characteristic line's slope) is made smaller than that of the first embodiment overall, and in a relatively narrow range BMb close to the continuous operation mode TM, control is performed such that the burst frequency fburst is changed sharply, namely, such that the change rate of the frequency with respect to the change amount of the load current Io is made large. A point Pt at which the change rate of the burst frequency fburst shifts from a small change rate to a large change rate is referred to as a frequency switching point.

Figure 10:
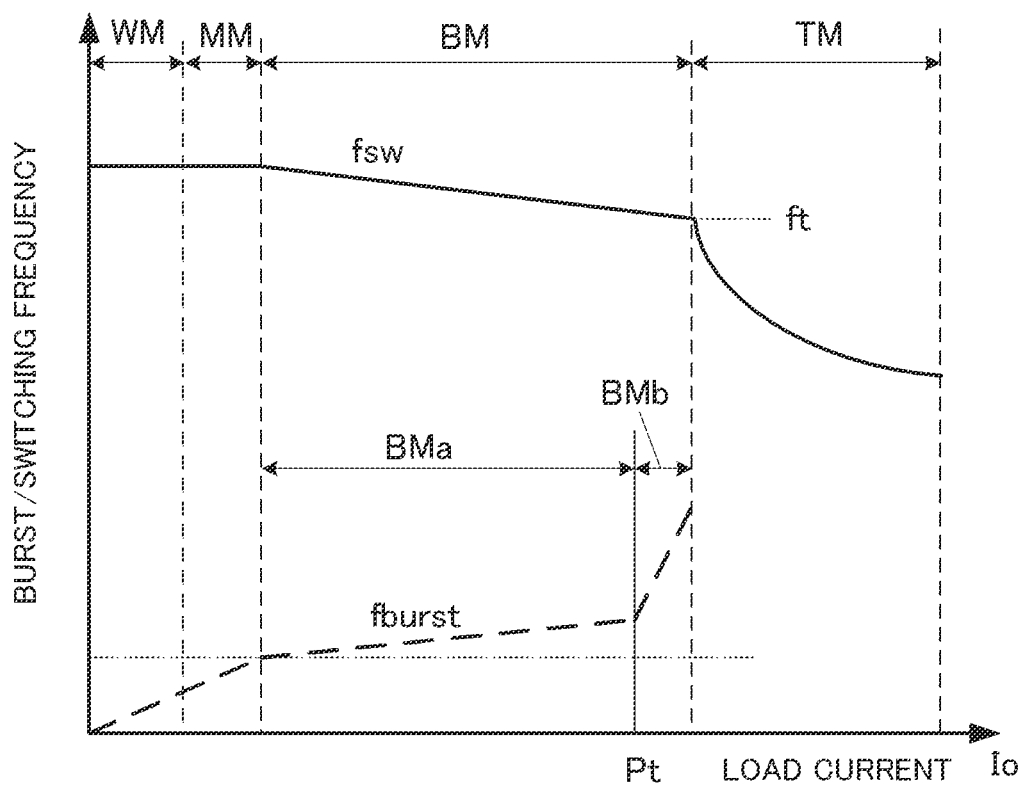
FIG. 10 is a characteristic diagram showing the load current to burst frequency and to switching frequency characteristic(s) of an AC-DC converter of a second embodiment of the present disclosure.

In the burst mode BM of this embodiment, as indicated by a solid line in FIG. 10, the switching frequency fsw of the main switch SW1 is controlled to decrease slowly as the load current Io increases. There is no problem even if the switching frequency fsw increases as the load current increases and "fsw<ft" holds.

The above-described control can keep the burst frequency to be lower than that of the first embodiment in almost the entire region of the burst mode BM and reduce the number of hard-switching times of the main switch SW1 per unit time. As a result, it is possible to reduce the switching loss in the main switch SW1 and the drive loss associated with charging/discharging of the gate capacitance, and improve the power efficiency of the power supply apparatus.

In this embodiment, malfunctions are prevented by logic. That is, even if the load current increases and the burst frequency increases during the operation in the burst mode BM, and packets of four pulses become continuous as indicated by A in FIG. 6 and the load current further increases, the packets are prevented from overlapping one another and correctly united with one other. More specifically, if in the burst mode BM, the load current increases and the packets become continuous, the control in the continuous operation mode TM is automatically performed. Thus, in this embodiment, no switching point (switching frequency) from the burst mode BM to the continuous operation mode TM needs to be set clearly.

Figure 11:
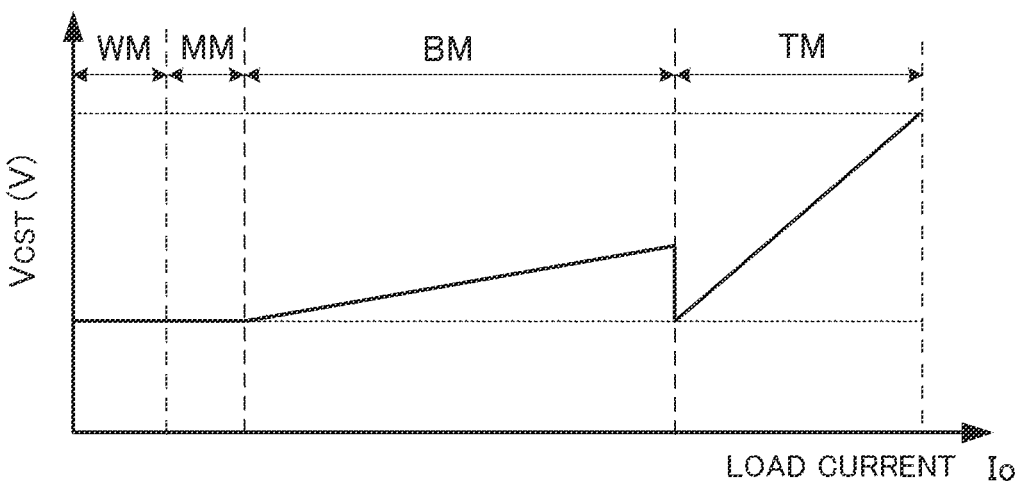
FIG. 11 is a characteristic diagram showing an example of the load current to turn-off threshold level VCST characteristic of the second embodiment.

Further, if, as described above, the switching control to make the change rate of the burst frequency (characteristic line's slope) small is performed in the relatively wide range BMa, an energy supply per unit time to the transformer 13 becomes short as much as the slope is made small. In order to make up the shortfall, in this embodiment, as shown in FIG. 11, in the burst mode BM, the turn-off threshold level VCST is set to be higher as the load current Io increases, so as to correspond to the change of the burst frequency shown in FIG. 10. Note that in the first embodiment, as shown in FIG. 9A, the turn-off threshold level VCST in the burst mode BM is set to be flat. The turn-off threshold level VCST in the continuous operation mode TM in the second embodiment may be the same as that in the first embodiment.

The above-described control in the burst mode BM can make the efficiency in the light load region, where the load current is small, higher in the power supply apparatus (AC-DC converter) of the second embodiment than in the power supply apparatus of the first embodiment.

Figure 12:
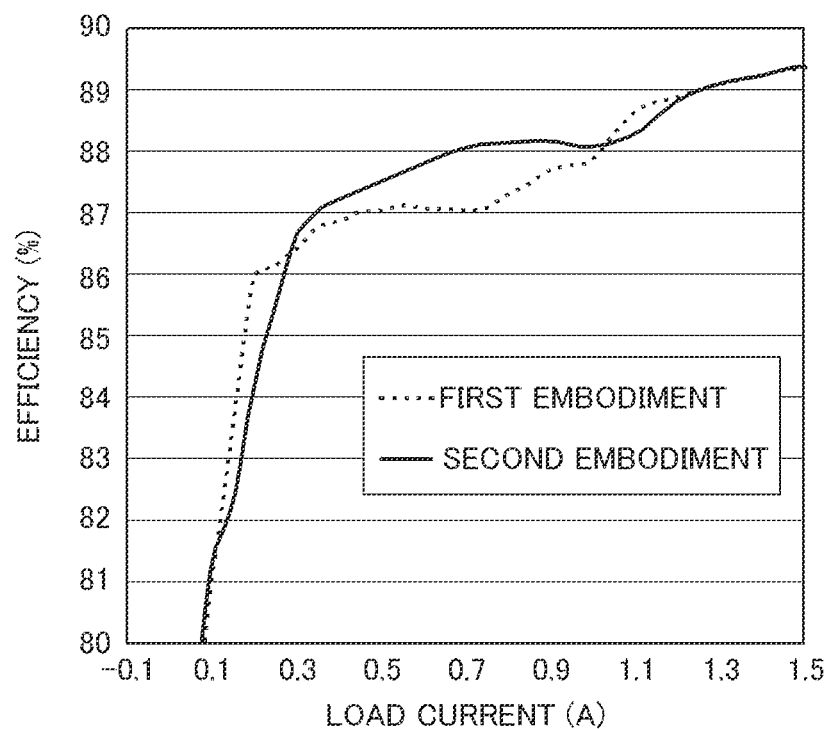
FIG. 12 is a characteristic diagram showing difference in the load current to efficiency characteristic between the AC-DC converter of the first embodiment and the AC-DC converter of the second embodiment.

The inventors calculated efficiencies of power supply apparatuses having the above-described control function by actual machine verification using FPGAs. The results are shown in FIG. 12. In FIG. 12, the efficiency of the power supply apparatus of the second embodiment is indicated by a solid line, and the efficiency of the power supply apparatus of the first embodiment is indicated by a broken line. As can be seen from FIG. 12, in the range of the load current of 0.2-0.9 A (ampere), namely, in the medium load to light load regions, the power supply apparatus of the second embodiment achieves a higher efficiency than the power supply apparatus of the first embodiment.

Figure 13:
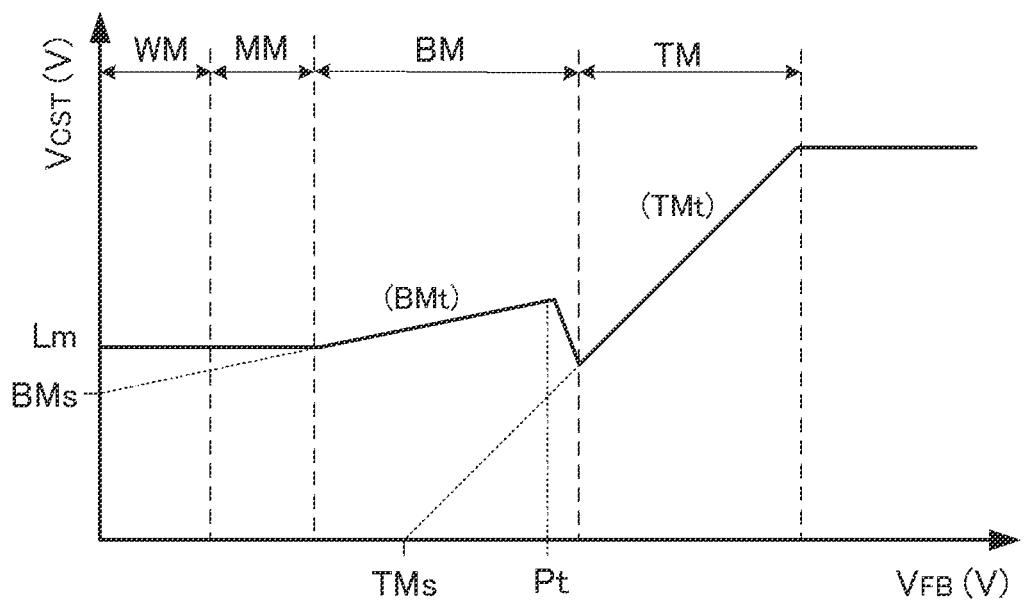
FIG. 13 is a characteristic diagram showing the feedback voltage to turn-off threshold level VCST of the second embodiment.

Incidentally, in the power supply apparatus of the second embodiment, a circuit is configured to generate the turn-off signal for the main switch SW1 on the basis of the voltage Vcs at the current detection terminal CS, and in order to enable the above-described operation in the burst mode, the turn-off threshold level VCST for the main switch SW1 is set to change with respect to the feedback voltage VFB in accordance with a characteristic shown in FIG. 13.

Figure 14:
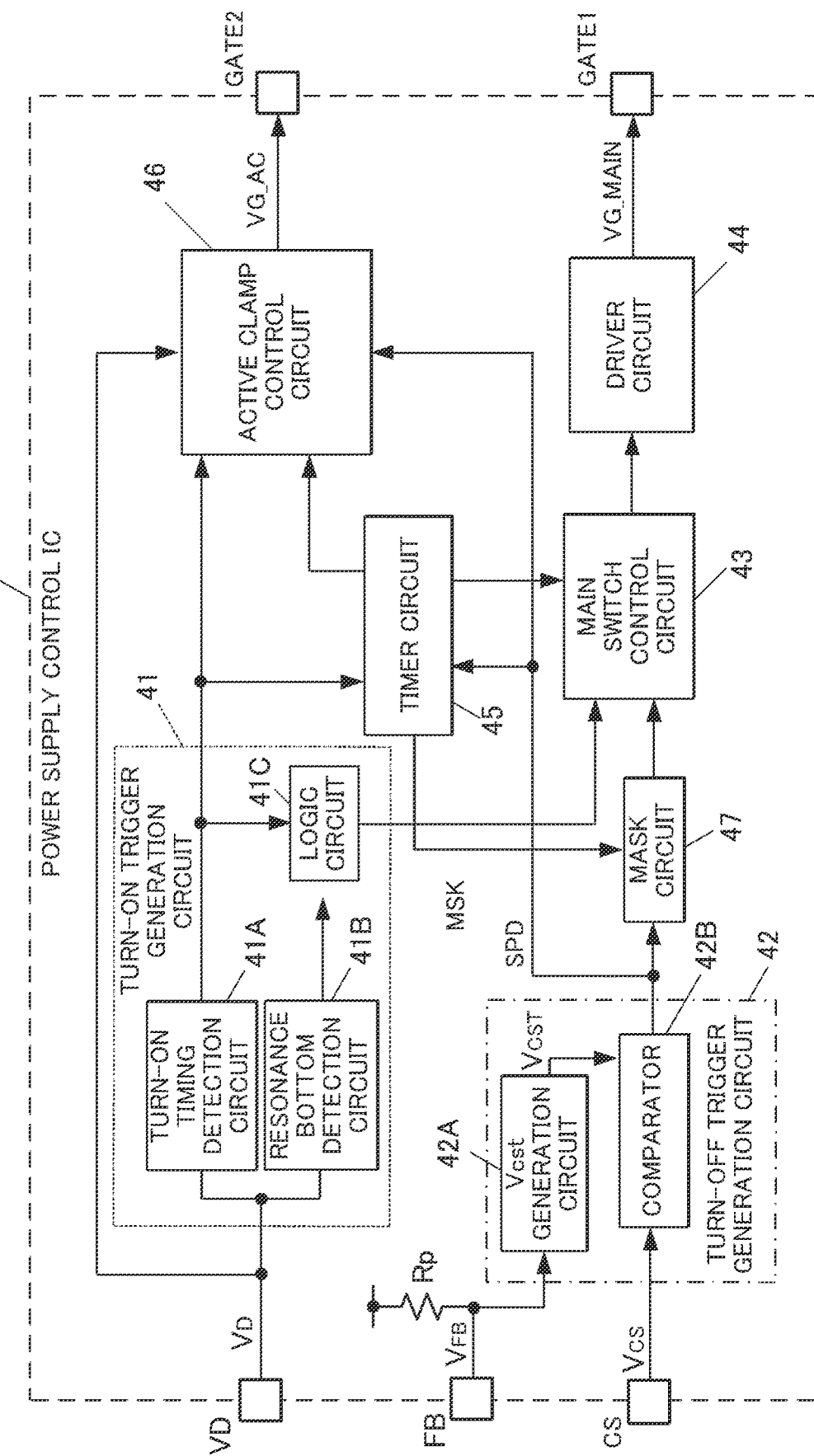
FIG. 14 is a block diagram showing an example of functional configuration of a power supply control IC constituting the AC-DC converter of the present disclosure.

FIG. 14 shows an example of configuration of the power supply control IC 14 constituting the power supply apparatus (AC-DC converter) of the second embodiment. Although a figure for the first embodiment is omitted, the power supply control IC 14 constituting the power supply apparatus of the first embodiment may have the configuration shown in FIG. 14.

As shown in FIG. 14, the power supply control IC 14 of this embodiment includes a turn-on trigger generation circuit 41 that monitors the voltage VD at the external terminal VD to which the drain voltage of the main switch SW1 is input and generates the turn-on signal for the main switch SW1 and a turn-off trigger generation circuit 42 that is composed of a comparator and so forth and generates the turn-off signal for the main switch SW1 on the basis of the voltage Vcs at the current detection terminal CS.

The power supply control IC 14 also includes a main switch control circuit 43 that takes, as inputs, the output of the turn-on trigger generation circuit 41 and the output of the turn-off trigger generation circuit 42, a driver circuit 44 that generates, in accordance with the output of the main switch control circuit 43, a gate driving signal VG MAIN to drive the main switch SW1 and outputs the signal from the external terminal GATE1, a timer circuit 45, and an active clamp control circuit 46 that generates a signal VG AC to drive the gate terminal of the transistor MAC for active clamp and outputs the signal from the external terminal GATE2. Although not shown, the active clamp control circuit 46 includes a driver circuit similar to the driver circuit 44.

The turn-on trigger generation circuit 41 includes a turn-on timing detection circuit 41A that is composed of a comparator and/or the like and detects that "the drain voltage VD of the SW1 input to the external terminal VD is equal to or less than a predetermined threshold" or "a predetermined period of not being ON has elapsed (in a case of no reach to zero voltage at the time of the burst or the like)", a resonance bottom detection circuit 41B that detects the bottom of resonance of the drain voltage VD, and a logic circuit 41C that is composed of an OR gate and/or the like and takes a logical sum of detection signals of the detection circuits 41A, 41B.

Instead of the circuit 41B that detects the bottom of resonance of the drain voltage VD, a circuit that detects the bottom of an induced voltage in the auxiliary winding Nb of the transformer 13 may be provided.

The turn-off trigger generation circuit 42 includes a threshold level generation circuit 42A that generates, on the basis of the voltage VFB at the feedback terminal FB, the turn-off threshold level VCST having the characteristic shown in FIG. 13 and a comparator 42B that compares the generated VCST with the voltage Vcs at the current detection terminal CS. On the subsequent stage of the turn-off trigger generation circuit 42, a mask circuit 47 composed of a logic gate, such as an AND gate, is provided to block, with a signal MSK from the timer circuit transmission of the turn-off signal to the main switch control circuit 43 for a predetermined time (minimum ON time) from turning-on of the main switch SW1. The main switch control circuit 43 has a function of generating successive pulses in the burst mode and performing the PWM control/quasi-resonant control in the continuous operation mode.

Further, in this embodiment, the output of the comparator 42B in the turn-off trigger generation circuit 42 is supplied to the active clamp control circuit 46. The active clamp control circuit 46 may have a function of, when receiving a pulsed signal SPD from the turn-off trigger generation circuit 42 within a predetermined time from turning-on of the main switch SW1, determining that the drain voltage has not dropped to zero voltage and the zero voltage switching control is not being performed, and when receiving no pulsed signal SPD within the predetermined time, determining that the zero voltage switching control is being performed.

The active clamp control circuit 46 may be capable of extending the ON time of the gate driving signal VG AC for the transistor MAC for a predetermined time Δt when determining, on the basis of the output from the turn-off trigger generation circuit 42, that the zero voltage switching control is not being performed.

In order to realize the above function, the timer circuit 45 is provided with multiple timers, such as a timer that measures the minimum ON time MOT and a timer that measures the extended time of the MAC being ON, and supplies signals related to timings to the active clamp control circuit 46.

The timer circuit 45 in FIG. 14 is shown thereat for the sake of convenience to explain this embodiment, but a timer(s) may be included in another circuit block(s).

Figure 15:
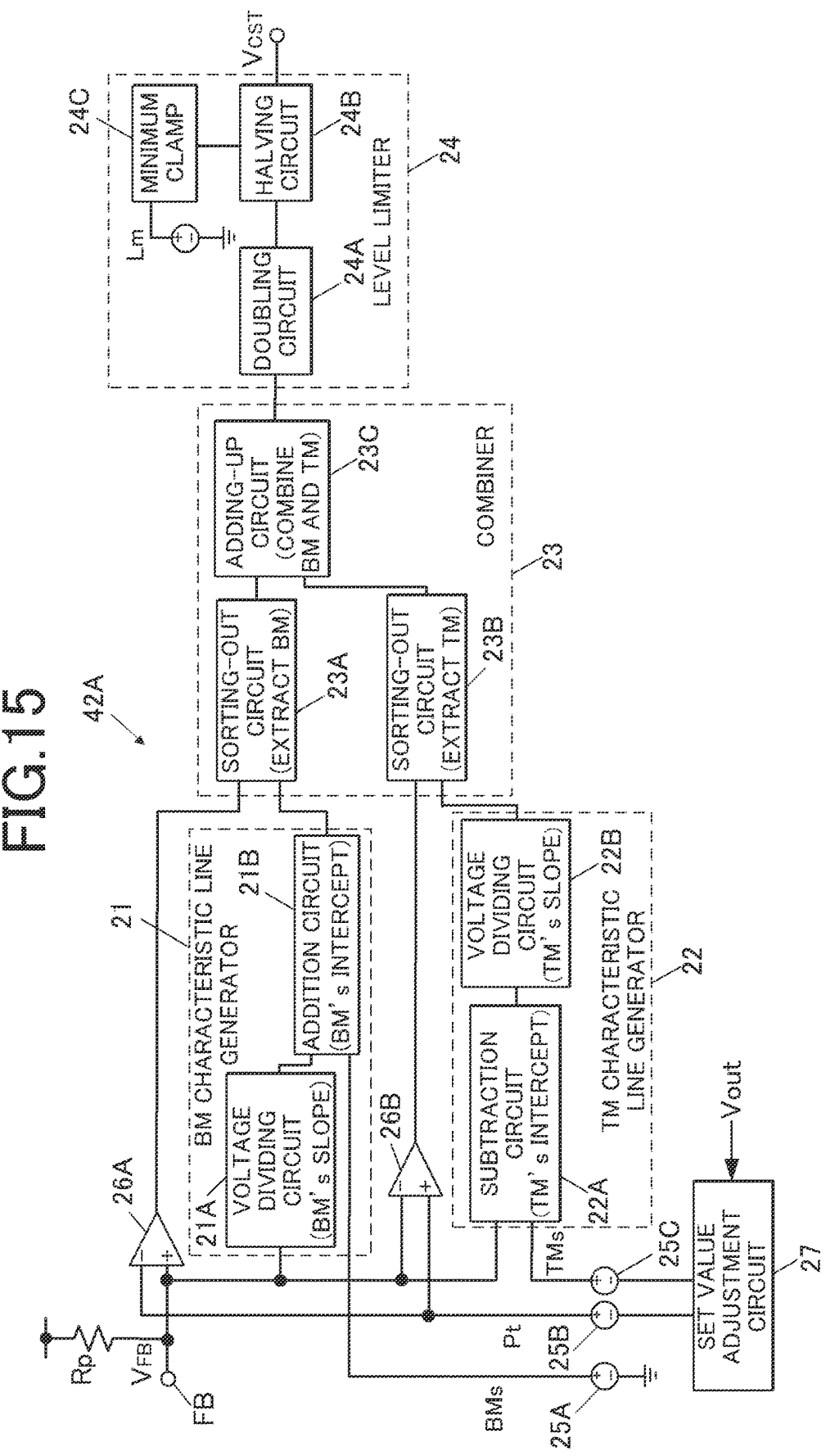
FIG. 15 is a block diagram showing an example of functional configuration of a threshold level generation circuit included in the power supply control IC shown in FIG. 14.

FIG. 15 shows an example of circuit configuration of the threshold level generation circuit 42A, which is included in the power supply control IC 14 shown in FIG. 14 and generates the turn-off threshold level VCST.

This threshold level generation circuit 42A includes a BM characteristic line generator 21 that generates a BM characteristic line (including an extension portion), a TM characteristic line generator 22 that generates a TM characteristic line (including an extension portion), a combiner 23 that generates, on the basis of the outputs of the characteristic line generators 21, 22, a VCST line spreading over the range from the WM to the TM in FIG. 13, and a level limiter 24 that generates a flat portion of the range from the WM to the MM in FIG. 13 by limiting the output level of the combiner 23.

The threshold level generation circuit 42A also includes a constant voltage source 25A that provides an intercept BMs of the BM characteristic line, a constant voltage source 25B that provides the switching point Pt, a constant voltage source 25C that provides an intercept TMs of the TM characteristic line, comparators 26A, 26B that compare the voltage from the constant voltage source 25B, (i.e., switching point Pt) and the voltage VFB at the feedback terminal FB obtained by current-to-voltage conversion by a resistor Rp, and the switching point Pt, and a set value adjustment circuit 27 for adjusting the values of the switching point Pt and the intercept TMs of the TM characteristic line. The reason why the set value adjustment circuit 27 is provided and the function of the circuit will be detailed later.

The BM characteristic line generator 21 includes a voltage dividing circuit 21A that divides the voltage VFB at the feedback terminal FB by a predetermined resistance ratio to determine a slope BMt of the BM characteristic line in FIG. 13 and generate the BM characteristic line including the extension portion and an addition circuit 21B that adds the voltage from the constant voltage source 25A to the output of the voltage dividing circuit 21A to shift the BM characteristic line in accordance with the intercept BMs.

The TM characteristic line generator 22 includes an subtraction circuit 22A that subtracts the voltage of the constant voltage source 25C from the voltage VFB at the feedback terminal FB to determine the starting point of the TM characteristic line, namely, the intercept TMs, and a voltage dividing circuit 22B that divides the output of the addition circuit 22A by a predetermined resistance ratio to determine a slope TMt of the TM characteristic line and generate the TM characteristic line including the extension portion.

The VCST combiner 23 includes a sorting-out circuit 23A that on the basis of the output of the BM characteristic line generator 21 and the output of the comparator 26A, takes out, from the BM characteristic line including the extension portion, a range extending in the region of the load current larger than that at the switching point Pt, thereby extracting the BM characteristic line of the region of the load current smaller than that at the switching point Pt, a sorting-out circuit 23B that takes out, from the TM characteristic line including the extension portion, a range extending in the region of the load current smaller than that at the switching point Pt, thereby extracting the TM characteristic line of the region of the load current larger than that at the switching point Pt, and an adding-up circuit 23C that combines the extracted BM characteristic line and TM characteristic line. When the combining is to be performed, the end edge of the BM characteristic line and the start edge of the TM characteristic line do not coincide. Then, for example, a line connecting the BM's end edge and the TM's start edge is interpolated, so that a continuous VCST line can be made.

The level limiter 24 includes a doubling circuit 24A that amplifies the output of the adding-up circuit 23C twofold, a halving circuit 24B that compresses the output of the doubling circuit 24A to one-half, and a minimum clamp circuit 24C that limits the minimum value of the characteristic line, into which the BM characteristic line and the TM characteristic line have been combined, to a predetermined level Lm to generate the flat portion of the range from the mode WM to the mode MM in FIG. 13.

The reason why the compression to one-half by the halving circuit 24B is performed after the amplification by the doubling circuit 24A is performed, so that the original is returned, is to improve precision of the clamp level by the minimum clamp circuit 24C. This may be omitted.

Next, the reason why the set value adjustment circuit 27 is provided and the function of the circuit will be described.

Figure 16A:
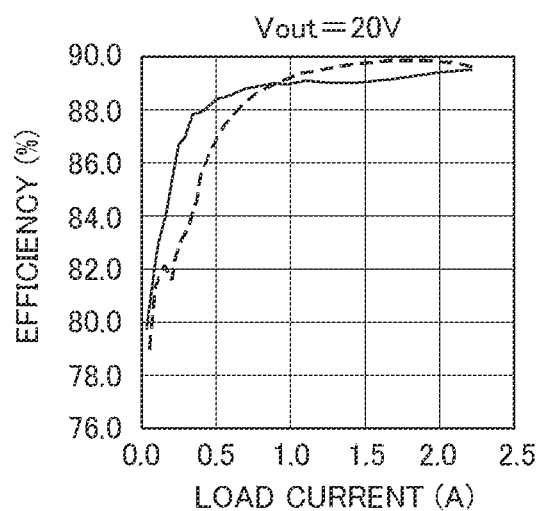
FIG. 16A is a characteristic diagram showing the load current to efficiency characteristic of the AC-DC converter of the embodiment(s) in a case where control in a BM mode is performed in light load to heavy load regions and in a case where control in a TM mode is performed in the light load to heavy load regions.
Figure 16B:
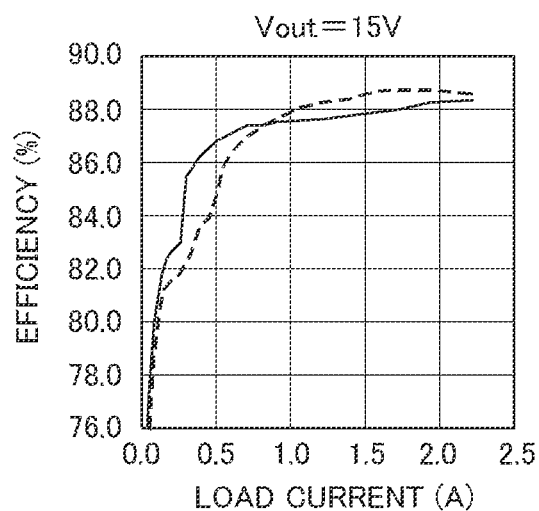
FIG. 16B is a characteristic diagram showing the load current to efficiency characteristic of the AC-DC converter of the embodiment(s) in the case where control in the BM mode is performed in the light load to heavy load regions and in the case where control in the TM mode is performed in the light load to heavy load regions.
Figure 16C:
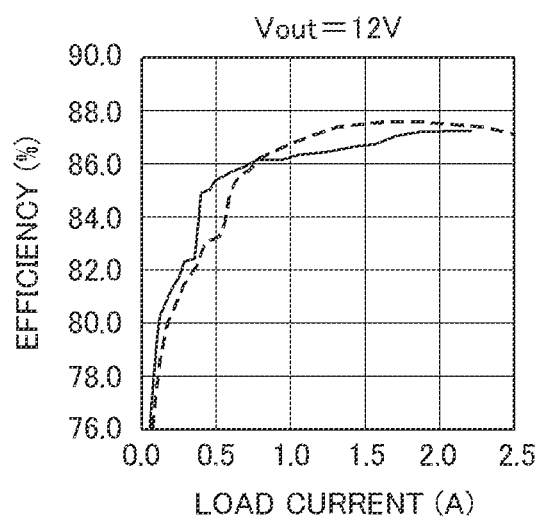
FIG. 16C is a characteristic diagram showing the load current to efficiency characteristic of the AC-DC converter of the embodiment(s) in the case where control in the BM mode is performed in the light load to heavy load regions and in the case where control in the TM mode is performed in the light load to heavy load regions.

FIG. 16A to FIG. 16C show the power efficiency in a case where the switching control in the burst mode is performed over the light load to heavy load regions and the power efficiency in a case where the switching control in the continuous operation mode is performed over the light load to heavy load regions. Solid lines therein are for the burst mode, and broken lines therein are for the continuous operation mode. FIG. 16A shows a case where the output voltage is 20 V, FIG. 16B shows a case where the output voltage is 15 V, and FIG. 16C shows a case where the output voltage is 12 V.

According to FIG. 16A to FIG. 16C, in each case, the efficiencies are turned while the load current changes. As can be seen therefrom, the point of the load current at which the efficiencies are turned differs depending on the magnitude of the output voltage. In a USB-PD power supply apparatus, the output voltage could switch, and when the output voltage switches, the mode switching point for achieving the highest efficiency changes.

From the above, the inventors found that it was better to switch the burst mode and the continuous operation mode at the point where the efficiencies are turned, and found that it was better to, if the output voltage changes, change the mode switching point in accordance with the output voltage.

Figure 17A:
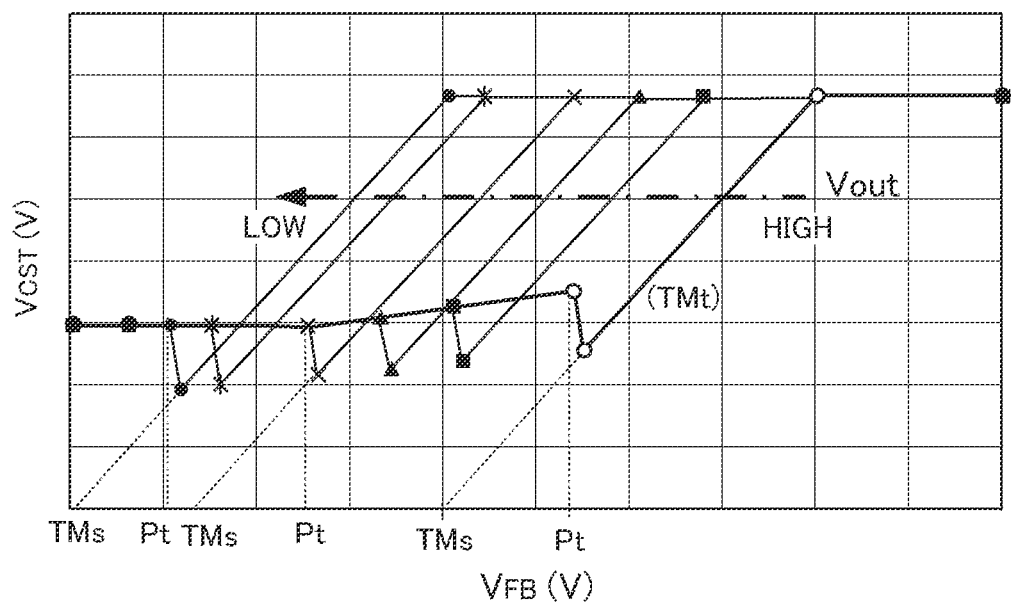
FIG. 17A is a characteristic diagram in a case where the load current to turnoff threshold level characteristic is changed according to an output voltage in the second embodiment.
Figure 17B:
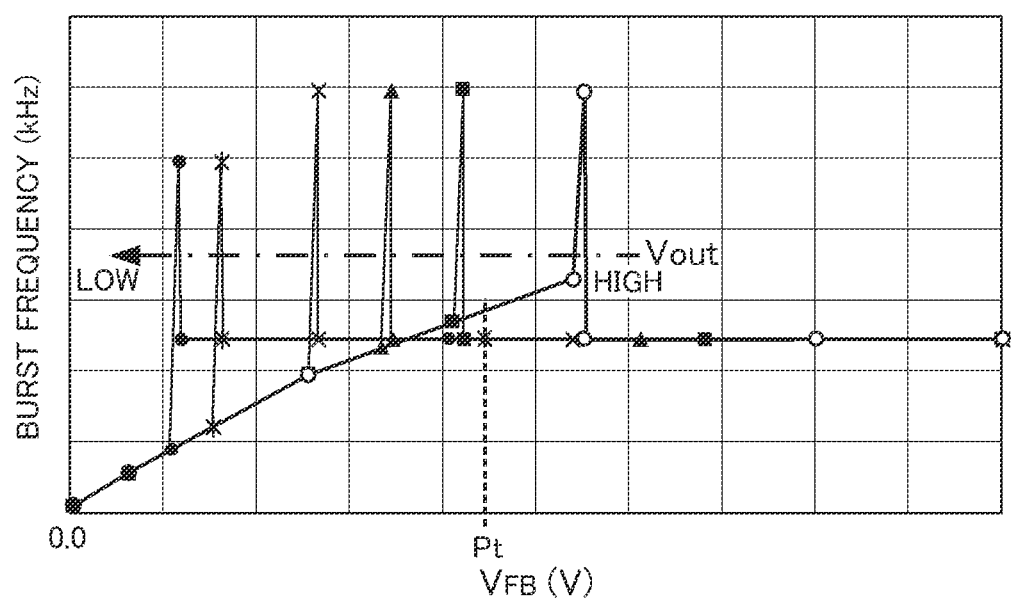
FIG. 17B is a characteristic diagram showing the feedback voltage to burst frequency characteristic in the characteristic of FIG. 17A.

Therefore, as shown in FIG. 17A, the VFB-VCST characteristic line is changed according to the output voltage Vout, and the characteristic of the burst frequency with respect to the feedback voltage in the characteristic shown in FIG. 17A is as shown in FIG. 17B. More specifically, the values of the switching point Pt and the intercept TMs of the TM characteristic line are made smaller as the output voltage Vout is lower. In order to enable this, the set value adjustment circuit 27 shown in FIG. 15 is provided. In FIG. 17A, the slope of the TM characteristic line remains the same even if the output voltage Vout differs.

Figure 18:
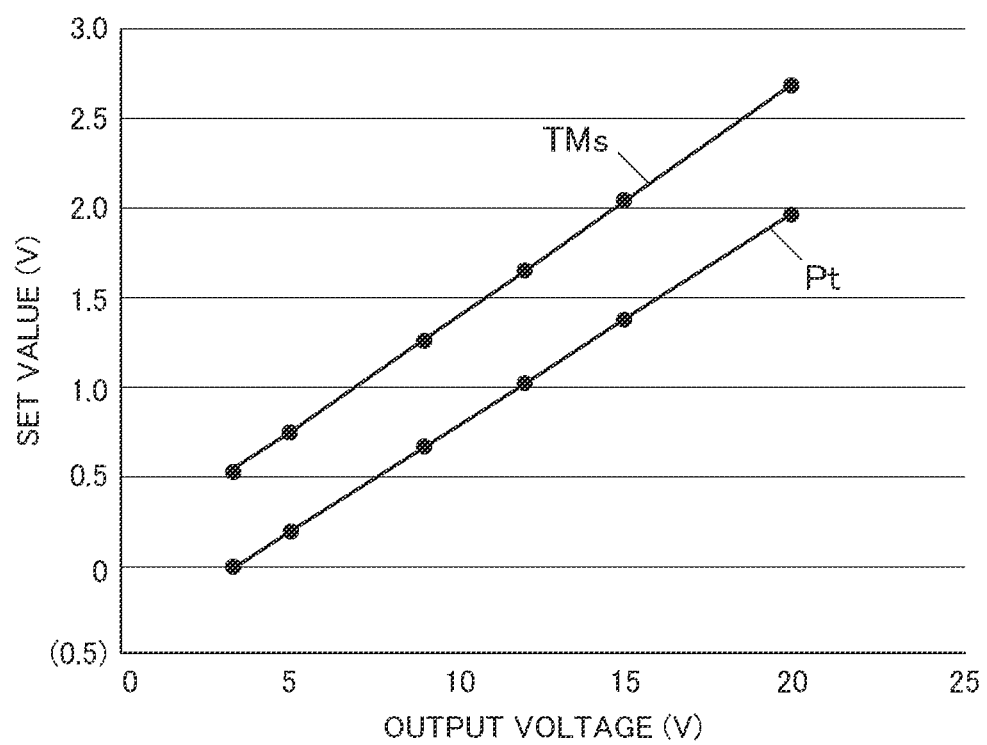
FIG. 18 shows a relationship between (i) an intercept of a TM characteristic line and a switching point and (ii) the output voltage in the second embodiment in the case where the load current to turnoff threshold level characteristic is changed according to the output voltage in the second embodiment.

FIG. 18 shows an example of adjustment of the values of the switching point Pt and the intercept TMs of the TM characteristic line with respect to the output voltage Vout. As shown in FIG. 18, in this embodiment, the values of the switching point Pt and the intercept TMs of the TM characteristic line are changed linearly with respect to the change of the output voltage Vout.

Figure 19A:
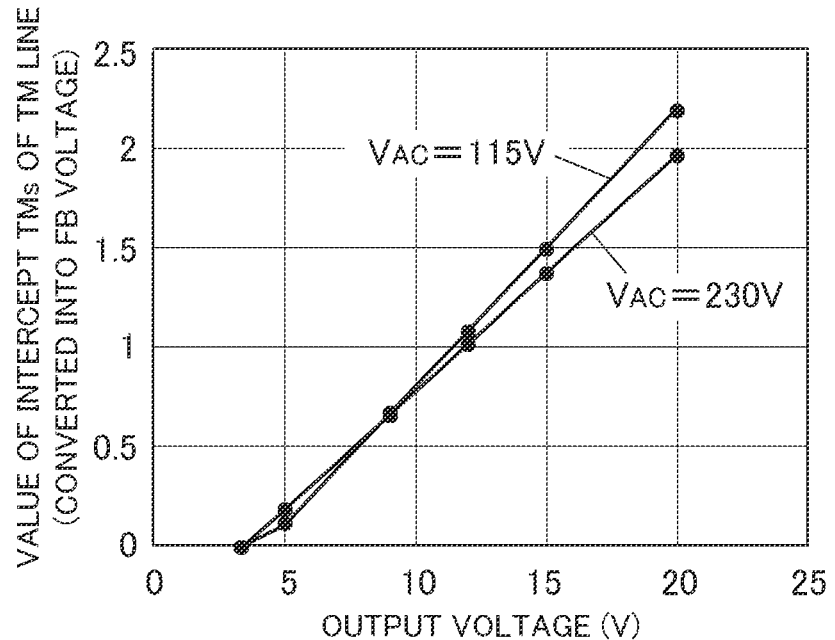
FIG. 19A shows a relationship between the output voltage and a set value in the case where the load current to turn-off threshold level characteristic is changed according to an input voltage in the second embodiment, showing an example of adjustment of a value of the intercept of the TM characteristic line.
Figure 19B:
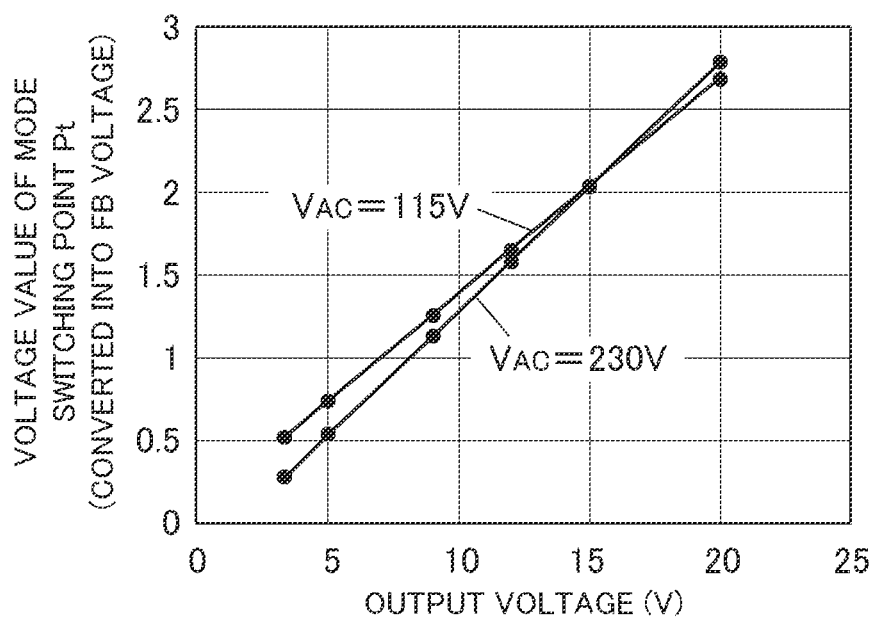
FIG. 19B shows a relationship between the output voltage and a set value in the case where the load current to turn-off threshold level characteristic is changed according to the input voltage in the second embodiment, showing an example of adjustment of a voltage value at the switching point.

Further, the inventors found from measurement results by actual machine verification using FPGAs that it was preferable that the values of the switching point Pt and the intercept TMs of the TM characteristic line with respect to the output voltage Vout be adjusted in a case of different voltage values VAC of an AC input too. FIG. 19A and FIG. 19B show set examples of the value of the intercept TMs of the TM characteristic line and the voltage value at the switching point Pt in a case where the voltage value VAC of the AC input is 115 V and in a case where the VAC is 230 V. FIG. 19A shows the set example of the value of the intercept TMs of the TM characteristic line converted into the FB voltage, and FIG. 19B shows the set example of the voltage value at the switching point Pt converted into the FB voltage, both with the different voltage values VAC of the AC input.

As described above, an aspect of the present disclosure is an insulated power supply apparatus including: a transformer for voltage conversion; a switching element connected in series with a primary-side winding of the transformer; an active clamp circuit connected between terminals of the primary-side winding of the transformer; and a semiconductor device for power supply control that controls the switching element and the active clamp circuit, wherein a current-to-voltage converter element is connected in series with the switching element, and wherein the semiconductor device for power supply control includes: a circuit that generates a timing to turn off the switching element based on a voltage obtained by conversion by the current-to-voltage converter element and a predetermined turn-off threshold level; a circuit that performs ON/OFF control of the switching element in a burst mode at a predetermined load or less; and a circuit that, in the burst mode, changes a burst frequency to be lower as a load current is smaller with the number of switching times of the switching element in one burst cycle fixed.

According to the above configuration, at the time of the medium load to the light load in the burst mode, the number of switching times of the switching element (main switch element) in one burst cycle is fixed in the state of being large, and the burst frequency is changed to be lower. This can reduce the number of hard-switching times per unit time, and improve the efficiency at the time of the medium load to the light load, at which the switching control in the burst mode is performed.

The isolated power supply apparatus and the semiconductor device for power supply control according to the present disclosure have an effect of preventing an increase in the power loss and a decrease in the efficiency in the medium load to light load regions too.

Although the present disclosure conceived by the inventors has been described in detail on the basis of the embodiments, the present disclosure is not limited to the above embodiments. For example, in the above embodiments, the main switch SW1 is a separate element from the power supply control IC 14, but may be incorporated into the power supply control IC 14, thereby being configured as a single semiconductor integrated circuit. Further, as the secondary-side circuit, the diode rectifying circuit is used, but a synchronous recertifying circuit may be used.

Further, in the above embodiments, the present disclosure is applied to an AC-DC converter, but may be applied to a DC-DC converter with the diode bridge circuit 12 omitted.

Although one or more embodiments of the present disclosure have been described above, the scope of the disclosure is not limited to the embodiments described above but includes the scope of claims below and the scope of their equivalents.

The invention claimed is:

1. An insulated power supply apparatus comprising:
a transformer for voltage conversion;
a switching element connected in series with a primary-side winding of the transformer;
an active clamp circuit connected between terminals of the primary-side winding of the transformer; and
a semiconductor device for power supply control that controls the switching element and the active clamp circuit,
wherein a current-to-voltage converter element is connected in series with the switching element,
wherein the semiconductor device for power supply control includes:
a circuit that generates a timing to turn off the switching element based on a voltage obtained by conversion by the current-to-voltage converter element and a predetermined turn-off threshold level;

a circuit that performs ON/OFF control of the switching element in a burst mode at a predetermined load or less; and a circuit that, in the burst mode, changes a burst frequency to be lower as a load current is smaller with a number of switching times of the switching element in one burst cycle fixed, wherein in a region of a load greater than the predetermined load, the ON/OFF control of the switching element is performed in a continuous operation mode, and wherein in the burst mode, in a partial range close to the continuous operation mode, control is performed such that a change rate of the burst frequency is made larger, and in a range except the partial range, control is performed such that the change rate of the burst frequency is made smaller.

2. The insulated power supply apparatus according to claim 1, wherein in the burst mode, the turn-off threshold level is set to be higher as the load current is larger.

3. The isolated power supply apparatus according to claim 1, wherein in the burst mode, the semiconductor device for power supply control performs the ON/OFF control of the switching element the number of switching times successively in each one burst cycle.

4. The isolated power supply apparatus according to claim 2, wherein in the burst mode, the semiconductor device for power supply control performs the ON/OFF control of the switching element the number of switching times successively in each one burst cycle.

5. An isolated power supply apparatus, comprising:
a transformer for voltage conversion;
a switching element connected in series with a primary-side winding of the transformer;
an active clamp circuit connected between terminals of the primary-side winding of the transformer; and
a semiconductor device for power supply control that controls the switching element and the active clamp circuit,
wherein a current-to-voltage converter element is connected in series with the switching element,
wherein the semiconductor device for power supply control includes:
a circuit that generates a timing to turn off the switching element based on a voltage obtained by conversion by the current-to-voltage converter element and a predetermined turn-off threshold level;
a circuit that performs ON/OFF control of the switching element in a burst mode at a predetermined load or less; and
a circuit that, in the burst mode, changes a burst frequency to be lower as a load current is smaller with a number of switching times of the switching element in one burst cycle fixed, and
wherein the burst frequency corresponding to a load current value at switching from a continuous mode to the burst mode performed at a time of the predetermined load or less is set to a frequency obtained by dividing a frequency immediately before the switching from the continuous mode to the burst mode by the number of switching times in one burst cycle.

6. The isolated power supply apparatus according to claim 5, wherein in the burst mode, the semiconductor device for power supply control performs the ON/OFF control of the switching element the number of switching times successively in each one burst cycle.

7. A semiconductor device for power supply control that (i) is included in an insulated power supply apparatus including: a transformer for voltage conversion; a switching element connected in series with a primary-side winding of the transformer; and an active clamp circuit connected between terminals of the primary-side winding of the transformer, and (ii) controls the switching element and the active clamp circuit, the semiconductor device for power supply control comprising:
an off-timing generation circuit that generates a timing to turn off the switching element based on a voltage obtained by conversion by a current-to-voltage converter element connected in series with the switching element and a predetermined turn-off threshold level;
a control circuit that performs ON/OFF control of the switching element in a burst mode at a predetermined load or less, and in the burst mode, changes a burst frequency to be lower as a load current is smaller with a number of switching times of the switching element in one burst cycle fixed;
an external terminal to which a feedback corresponding to an output voltage supplied from a secondary side of the transformer is input; and
a threshold level generation circuit that generates the turn-off threshold level based on a voltage at the external terminal,
wherein the control circuit performs the ON/OFF control of the switching element in a continuous operation mode in a region of a load greater than the predetermined load, and
wherein the threshold level generation circuit includes:
a circuit that generates a first characteristic line for the burst mode;
a circuit that generates a second characteristic line for the continuous operation mode;
a circuit that combines a characteristic extracted from the first characteristic line and a characteristic extracted from the second characteristic line in accordance with a switching point between the burst mode and the continuous operation mode; and
a circuit that limits a minimum value of a characteristic line obtained by the combining.

8. The semiconductor device for power supply control according to claim 6,
wherein the circuit that generates the second characteristic line includes:
a subtraction circuit that subtracts a predetermined set value from a voltage value at the external terminal; and
a voltage dividing circuit that divides an output of the subtraction circuit, and
wherein the semiconductor device for power supply control further comprises a set value adjustment circuit that is capable of changing the switching point and the predetermined set value in accordance with an output voltage value.

* * * * *